(12) United States Patent
Manten et al.

(10) Patent No.: US 12,521,933 B2
(45) Date of Patent: Jan. 13, 2026

(54) METHOD FOR FORMING A HEATED THERMOPLASTIC COMPOSITE INTO A CLOSED PROFILE USING A TOOLING

(71) Applicant: Dutch Thermoplastic Components B.V., Almere (NL)

(72) Inventors: David Reijer Manten, Almere (NL); Dennis Lunenborg, Almere (NL); Peter Floris Evert Boer, Almere (NL); Wesley Houtman, Almere (NL)

(73) Assignee: DUTCH THERMOPLASTIC COMPONENTS B.V., Almere (NL)

( * ) Notice: Subject to any disclaimer, the term of this patent is extended or adjusted under 35 U.S.C. 154(b) by 1 day.

(21) Appl. No.: 18/278,920

(22) PCT Filed: Feb. 24, 2022

(86) PCT No.: PCT/NL2022/050108
§ 371 (c)(1),
(2) Date: Aug. 25, 2023

(87) PCT Pub. No.: WO2022/182238
PCT Pub. Date: Sep. 1, 2022

(65) Prior Publication Data
US 2024/0051216 A1 Feb. 15, 2024

(30) Foreign Application Priority Data
Feb. 26, 2021 (NL) .................................. 2027672

(51) Int. Cl.
*B29C 53/42* (2006.01)
*B29C 53/00* (2006.01)
(Continued)

(52) U.S. Cl.
CPC ............ *B29C 53/42* (2013.01); *B29C 53/005* (2013.01); *B29C 53/82* (2013.01);
(Continued)

(58) Field of Classification Search
CPC .............................. B29C 53/42; B29C 70/541
See application file for complete search history.

(56) References Cited

U.S. PATENT DOCUMENTS

| 1,433,879 A | * | 10/1922 | Fancher | ................... | B21D 5/01 |
| | | | | | 72/399 |
| 1,850,679 A | * | 3/1932 | Leis | ........................ | B21D 5/01 |
| | | | | | 72/405.06 |

(Continued)

FOREIGN PATENT DOCUMENTS

FR 2542925 A1 9/1984

OTHER PUBLICATIONS

International Search Report and Written Opinion for the International Application No. PCT/NL2022/050108, mailed May 16, 2022, 10 pages.

*Primary Examiner* — Benjamin A Schiffman
(74) *Attorney, Agent, or Firm* — KDW Firm PLLC

(57) ABSTRACT

A method for forming a heated thermoplastic composite material into a closed profile using a tooling includes a) forming, during a first forming stage, a heated thermoplastic composite in a first space between a male tooling part and a female tooling part, b) forming, during a second forming stage, the thermoplastic composite material by engaging a first segment and/or second segment of the thermoplastic composite material with at least one auxiliary tooling part to thereby bring the first and second segments closer together, and c) forming, during a third forming stage, the thermoplastic composite material by pressing, using a pressing tooling part, the thermoplastic composite material around the male tooling part thereby creating a seam between the first and second segment.

20 Claims, 8 Drawing Sheets

(51) Int. Cl.
   *B29C 53/82* (2006.01)
   *B29K 101/12* (2006.01)
   *B29K 105/08* (2006.01)
   *B29K 309/08* (2006.01)

(52) U.S. Cl.
   CPC .. *B29K 2101/12* (2013.01); *B29K 2105/0854* (2013.01); *B29K 2309/08* (2013.01)

(56) References Cited

U.S. PATENT DOCUMENTS

| | | | |
|---|---|---|---|
| 3,952,676 A | 4/1976 | Rockefeller | |
| 4,411,148 A * | 10/1983 | Aschauer | B21D 5/045 |
| | | | 72/306 |
| 4,565,002 A * | 1/1986 | Matsuo | H01M 50/40 |
| | | | 29/623.4 |
| 5,327,764 A * | 7/1994 | Weykamp | B21D 26/021 |
| | | | 72/296 |
| 5,582,058 A * | 12/1996 | Knudson | F16L 3/127 |
| | | | 248/300 |
| 6,701,990 B1 * | 3/2004 | Burley | B29D 99/0003 |
| | | | 156/465 |
| 7,141,199 B2 * | 11/2006 | Sana | B29C 70/46 |
| | | | 264/296 |
| 7,527,759 B2 * | 5/2009 | Lee | B29C 33/308 |
| | | | 264/319 |
| 8,465,613 B2 * | 6/2013 | Rotter | B29C 70/461 |
| | | | 264/296 |
| 8,551,382 B2 * | 10/2013 | Anderson | B29C 70/34 |
| | | | 264/318 |
| 8,597,015 B2 * | 12/2013 | Henderson | B29C 70/30 |
| | | | 425/389 |
| 9,283,715 B2 * | 3/2016 | Schroder | B29C 70/541 |
| 9,387,628 B2 * | 7/2016 | Chapman | B29C 70/462 |
| 11,654,639 B2 * | 5/2023 | Manten | B29C 66/721 |
| | | | 428/105 |
| 11,766,840 B2 * | 9/2023 | Kendall | B29C 70/16 |
| | | | 156/242 |
| 2005/0051932 A1 * | 3/2005 | Danzik | B29C 33/26 |
| | | | 264/313 |
| 2023/0070857 A1 * | 3/2023 | Manten | B29C 70/541 |
| 2023/0321923 A1 * | 10/2023 | Manten | B29C 65/305 |
| | | | 156/311 |

* cited by examiner

METHOD FOR FORMING A HEATED THERMOPLASTIC COMPOSITE INTO A CLOSED PROFILE USING A TOOLING

CROSS-REFERENCE TO RELATED APPLICATIONS

This application is a national stage filing under 35 U.S.C. 371 of pending International Application No. PCT/NL2022/050108, filed Feb. 24, 2022, which claims priority to Netherlands patent application 2027672, filed Feb. 26, 2021, the entirety of which applications are incorporated by reference herein.

BACKGROUND

The present invention relates to a method for forming a heated thermoplastic composite material into a closed profile using a tooling. The present invention further relates to a tooling for implementing the method and to a closed profile made using such a method. The present invention particularly relates to elongated profiles.

Thermoplastic composite materials consist of a thermoplastic matrix combined with a reinforcing material typically in the form of fibers, such as carbon fibers. Most of the thermoplastic composite materials comprise multiple layers, wherein each layer comprises fibers that are encapsulated, surrounded, and/or supported by a relatively thin layer of thermoplastic material. Hereinafter, such layer will be referred to as a ply. Generally, there exists a single orientation of the fibers within a single ply.

To form a thermoplastic composite product, multiple plies are arranged on top of each other, wherein the orientation of the fibers changes in the layer stack. For example, a ply stack may comprise a plurality of plies wherein the orientation of the fibers of adjacent plies is orthogonal to each other.

After having arranged the plies into a ply stack, the stack is subjected to a consolidation process in which the thermoplastic material of the ply stack is brought to a temperature above the melting point of the thermoplastic material. Typically, pressure is simultaneously exerted onto the ply stack. Due to the melting of the thermoplastic material, the fibers will be supported by a single substantially integral body of the thermoplastic material.

After the consolidation process, generally a sheet of thermoplastic composite material is obtained. To make the final thermoplastic composite product, the sheet must be subjected to a forming process. Such a process is schematically illustrated in FIG. 1. During this process, a sheet 3 is heated so that it may be shaped using appropriate tooling. This tooling typically comprises a female tooling part 2 having a recess 2A and a male tooling part 1 that is configured to be at least partially received in recess 2A. By arranging sheet 3 of heated thermoplastic composite material in between male tooling part 1 and female tooling part 2 and by subsequently pressing these tooling parts together, sheet 3 can be shaped in correspondence with a shape of recess 2A.

A problem with the abovementioned process is that it does not allow for the formation of closed profiles. An example of a closed profile 4 is depicted in FIG. 2. Within the context of the present invention, a closed profile 4 is a profile that comprises a first section 4A and a curved section 4B that is connected on opposing sides thereof to first section 4A thereby defining a closed inner space 4E.

In the prior art, closed profiles of thermoplastic composite material of the type shown in FIG. 2 are typically realized by separately forming sections 4A and 4B using the method described above and connecting these sections using seams, such as seams 4C illustrated in FIG. 2. Hence, for realizing an elongated profile multiple operations are required. Furthermore, a minimum of two seams is required for connecting sections 4A, 4B.

SUMMARY

An object of the present invention is to provide a method for forming a heated thermoplastic composite material into a closed profile using a tooling in which the profile can be made in a single operation using a single seam. According to the present invention, this object is achieved using the method as defined in claim 1 which comprises the step of a) forming, during a first forming stage, a heated thermoplastic composite material, which is typically in the form of a sheet, in a first space between a male tooling part and a female tooling part, the thermoplastic composite material comprising, after having performed the first forming stage, a first segment, a second segment, and an intermediate segment integrally connecting the first segment to the second segment, wherein the intermediate segment is arranged in the first space, and wherein the first segment and the second segment extend outside of said first space. The method comprises the additional step of b) forming, during at least one second forming stage, the thermoplastic composite material by engaging the first segment and/or second segment with at least one auxiliary tooling part to thereby bring the first and second segments closer together. Additionally, the method comprises the step of c) forming, during a third forming stage, the thermoplastic composite material by pressing, using a pressing tooling part, the thermoplastic composite material around the male tooling part thereby creating a seam between the first and second segment. During the third forming stage, the intermediate segment and parts of the first segment and second segment associated with the seam are confined in a second space between the male tooling part, the female tooling part, and at least one among the pressing tooling part and the at least one auxiliary tooling part.

According to the present invention, the forming process comprises three stages. The first forming stage is similar to that of the prior art illustrated in FIG. 1. However, the second forming stage comprises using at least one auxiliary tooling part to bring the first and second segments closer together. Without the second forming stage, the first and second segments would, when moving away from the male tooling part, diverge from each other or at least extend parallel to each other. This would prevent a seam from being made during the third forming stage.

During the third forming stage, that part of the thermoplastic composite material responsible for forming the closed profile is comprised in a second space. This space is formed around the male tooling part. On one side the second space is delimited by the female tooling part and on another side by at least one among the pressing tooling part and the at least one auxiliary tooling part. For example, assuming that two auxiliary tooling parts A and B are used during the second forming stage and that a female tooling part F, a male tooling part M, and a pressing tooling part P are used, the second space could be delimited by 1) F, M, A or 2) F, M, A, B or 3) F, M, B, or 4) F, M, P, or 5) F, M, A, P, or 6) F, M, A, B, P, or 7) F, M, B, P.

In cases 1, 2, 3, the pressing tooling part only exerts a pressure on the thermoplastic composite material via the auxiliary tooling part(s). Put differently, during the third forming process, the second space may be delimited by the male tooling part, the female tooling part, and one or more auxiliary tooling parts among the at least one auxiliary tooling part, and during the third forming stage, the pressing tooling part presses solely onto the one or more auxiliary tooling parts.

In case 4, the pressing tooling part only exerts a pressure on the thermoplastic composite material directly. Put differently, during the third forming stage, the second space may be delimited by the male tooling part, the female tooling part, and the pressing tooling part, and during the third forming process, the pressing tooling part presses directly on the thermoplastic composite material.

In cases 5, 6, 7, the pressing tooling part partially exerts a pressure on the thermoplastic composite material directly and partially via the auxiliary tooling part(s). To this end, the pressing tooling part can be provided with one or more recesses. Put differently, during the third forming stage, the second space is delimited by the male tooling part, the female tooling part, one or more auxiliary tooling parts among the at least one auxiliary tooling part, and the pressing tooling part. Moreover, during the third forming stage, a part of the pressing tooling part may press onto the thermoplastic composite material directly and a part of the pressing tooling part may press onto the thermoplastic composite material through the one or more auxiliary tooling parts that are at least partially received in the one or more recesses of the pressing tooling part.

During the first forming stage, the intermediate segment of the thermoplastic composite material is arranged in a first space between the female tooling part and the male tooling part whereas during the third forming stage, the intermediate segment and parts of the first segment and second segment associated with the seam are confined in a second space between the male tooling part, the female tooling part, and at least one among the pressing tooling part and the at least one auxiliary tooling part. Firstly, it is noted that the female tooling part and/or the male tooling part may be moving or moved in absolute space. Accordingly, the first and second spaces are defined relative to the female tooling part. Secondly, it may well be that during the third forming stage, the thermoplastic composite is compressed even more between the female tooling part and the male tooling part. Consequently, the second space may not completely encompass the first space but may show a partial overlap therewith.

The second forming stage can be performed by engaging the first segment from a first direction and/or by engaging the second segment from a second direction. In addition, the third forming stage can be performed by pressing the thermoplastic composite material from a third direction. Both the first and second direction can be each at least partially perpendicular to the third direction, and the first and second direction can be at least partially opposite to each other. In a particular embodiment, the first and second segments are horizontally engaged and the third direction corresponds to a vertical direction. Furthermore, during the first forming stage, the male tooling part may exert a pressure on the thermoplastic composite material that is at least partially directed in the third direction.

The female tooling part may comprise a recess. The first forming stage may comprise mutually moving the male tooling part and the female tooling part towards each other such that the male tooling part becomes at least partially accommodated in a recess in the female tooling part while the thermoplastic composite material is arranged in the first space between the male tooling part and the female tooling part.

During the third forming stage, the first and second segments may be fully confined in the second space. Alternatively, the second space has an opening through which at least one of the first segment and second segment extends.

The male tooling part may comprise a first section configured for pressing against the thermoplastic composite material and at least one second section that is releasably coupled to the first section and that is configured to be supported or driven during the second and third forming stages. In this case, the method may comprise separating the formed thermoplastic composite material from the male tooling part by decoupling the at least one second section from the first section, separating the decoupled at least one second section from the first section, and separating the first section from the formed thermoplastic composite material. Here, it is noted that within the context of the present invention an action of separating element A from element B should be construed as increasing a distance between elements A and B by moving A, by moving B, or by moving A and B.

In addition, the method may comprise performing, prior to the step of separating the formed thermoplastic composite material from the male tooling part, the steps of separating the pressing tooling part from the male tooling part, separating the one or more auxiliary parts from the male tooling part if applicable, and jointly separating the male tooling part and the formed thermoplastic composite material from the female tooling part. For example, the male tooling part may be mechanically coupled to the pressing tooling part through the at least one second section. By decoupling the at least one second section from the first section, the first section is no longer mechanically coupled to the pressing tooling part. Rather, it lies freely within the recess of the female tooling part. This allows a user to remove the first section with the formed thermoplastic composite material around it to be separated from the female tooling part.

The second forming stage may comprise engaging the first segment and/or second segment with at least one auxiliary tooling part to thereby bring the first and second segments into abutment. More in particular, as a result of performing the second forming stage, the first and segment may already touch each other or be in very close proximity. In other embodiments, such abutment is only achieved after having performed the third forming stage.

The second forming stage may comprise engaging each of the first segment and/or second segment sequentially with different auxiliary tooling parts among the at least one auxiliary tooling part. For example, the at least one auxiliary tooling part may comprises four auxiliary tooling parts. The first two auxiliary tooling parts can be configured for engaging the first segment after each other, and the last two auxiliary tooling parts can be configured for engaging the second segment after each other. It should be noted that in this example the first and third auxiliary tooling parts and/or the second and fourth auxiliary tooling parts may simultaneously engage the first segment and second segment, respectively.

The male tooling part, the female tooling part, the at least one auxiliary tooling part, and the pressing tooling part may be elongated along respective longitudinal axes. These axes may be straight or curved. Furthermore, during the third forming stage and at least locally, the male tooling part, female tooling part, the at least one auxiliary tooling part, and the pressing tooling part if applicable may engage the thermoplastic composite material from respective directions that are each at least locally perpendicular to the respective longitudinal axis. For example, the recess in the female tooling part may have a shape similar to that of a curved groove. A transverse cross sectional shape of this groove may be constant along its longitudinal axis. When the thermoplastic composite material is arranged in this groove, forces are exerted onto thermoplastic composite material in directions that lie in the transverse cross sectional plane, i.e. perpendicular to the longitudinal axis of the groove.

The second space may be straight or curved along its longitudinal axis. Furthermore, the second space may be tapered along its longitudinal axis.

According to a second aspect, the present invention provides a tooling for forming a heated thermoplastic composite material into a closed profile according to the abovementioned method. This tooling comprises a female tooling part comprising a recess, a male tooling part having a shape that is at least partially complementary to the recess, at least one auxiliary tooling part, a pressing tooling part, and a drive system. The drive system is configured for mutually moving the male tooling part and the female tooling part for the purpose of performing the third forming stage, for mutually moving the at least one auxiliary tooling part and the male tooling part for the purpose of performing of the second forming stage, and for mutually moving the pressing tooling part and the female tooling part for the purpose of performing the third forming stage. It should be noted that within the context of the present invention mutually moving element A and element B should be construed as moving element A while keeping element B stationary, moving element B while keeping element A stationary, or moving both element A and element B. In addition, the drive system may be configured to keep driving the pressing tooling part, female tooling part, and/or one or more auxiliary parts among the at least one auxiliary part, during the third forming stage after the pressing tooling part comes into abutment with the one or more auxiliary parts and/or thermoplastic composite material.

The male tooling part can be mechanically coupled to the pressing tooling part through one or more resilient members. For example, the male tooling part may comprise a first section configured for pressing against the thermoplastic composite material and at least one second section that is releasably coupled to the first section and that is coupled to the pressing tooling part through one or more respective resilient members. The first and the at least one second section may each comprise coupling means for releasably coupling the first section and the at least one second section for the purpose of allowing the first section and the formed thermoplastic composite material to be jointly removed from a remainder of the tooling after having decoupled the at least one second section from the first section. Additionally or alternatively, the resilient members can be configured such that during said mutually moving the pressing tooling part and the female tooling part the male tooling part is allowed to move towards the pressing tooling part against a spring force exerted by the resilient members until a pressing surface of the pressing tooling part lies against the thermoplastic composite material and/or one or more auxiliary parts among the at least one auxiliary part.

The pressing tooling part may be provided with one or more recesses for at least partially receiving the one or more auxiliary tooling parts during the third forming stage. More in particular, the first and/or second segment is engaged by the plurality of auxiliary tooling parts. However, among those auxiliary tooling parts, one or more auxiliary parts remain in place during the third forming stage allowing them to be engaged by the pressing tooling part. Additionally or alternatively, the at least one auxiliary tooling part can be mechanically coupled to the female tooling part. For example, the at least one auxiliary tooling part can be slideably or pivotally coupled to the female tooling part. Actuation of the at least one auxiliary tooling part may be performed using conventional actuators such as pneumatic or hydraulic cylinders, or electric motors such as linear motors. Similar cylinders or motors may be used for actuating the female tooling part, the male tooling part, and the pressing tooling part.

In a particular embodiment, the pressing tooling part can be kept stationary during the first, second, and third forming stages. In this case, the drive system can be configured to perform the sequential steps of a) moving the female tooling part towards the pressing tooling part until the male tooling part is received in the recess, b) actuating the at least one auxiliary tooling part for performing the second forming stage, and c) moving the female tooling part towards the pressing tooling part for performing the third forming stage. Furthermore, the drive system can be configured to perform the sequential steps of d) moving the female tooling part away from the pressing tooling part, and e) actuating one or more auxiliary parts among the at least one auxiliary part to move away from the male tooling part.

Alternatively, the female tooling part can be kept stationary during the first, second, and third forming stages. In this case, the drive system can be configured to perform the sequential steps of a) moving the pressing tooling part towards the female tooling part until the male tooling part is received in the recess, b) actuating the at least one auxiliary tooling part for performing the second forming stage, and c) moving the pressing tooling part towards the female tooling part for performing the third forming stage. Furthermore, the drive system can be configured to perform the sequential steps of d) moving the pressing tooling part away from the female tooling part, and e) actuating one or more auxiliary parts among the at least one auxiliary part to move away from the male tooling part.

For both configurations mentioned above, the drive system can be configured to automatically perform step b) after completion of step a) and/or automatically perform step c) after completion of step b) and/or automatically perform step d) after completion of step c) and/or automatically perform step e) after completion of step d).

To enable automatically performing steps, the tooling may comprise one or more detectors for detecting completion of one or more steps among steps a)-d), the one or more detectors comprising a position detector, a contact detector, and/or a timer. As a first example, a position detector may determine that the male tooling part is suitably received in the recess such that step b) can be performed. However, such detection could also comprise determining that step a) has been performed for a given amount of time using a timer. In such case, it is assumed that step a) has been appropriately conducted if this step has been performed during a predetermined amount of time. As a third example, contact between the male tooling part and female tooling part, albeit via the thermoplastic composite material, could be detected using a contact detector. Multiple transitions between the abovementioned steps could be automated using one or more detectors of the type described above.

Alternatively, at least one step among steps a)-d) can be mechanically coupled to at least one step among steps step b)-e) such that at an end of the relevant motion during a given step, the corresponding next step is initiated. For example, having moved the pressing tooling part towards the female tooling part sufficiently may unlock the movement of the auxiliary tooling part as a result of which the auxiliary tooling part is actuated.

According to a third aspect, the present invention provides a closed profile made of a thermoplastic composite material, wherein the profile comprises a first section and a curved section of which one end is integrally connected to the first section, and of which an opposing end is fixedly connected to the first section using a single seam thereby defining a closed inner space. The closed profile is preferably elongated as described above.

BRIEF DESCRIPTION OF THE DRAWINGS

Next, the present invention will be described in more detail referring to the appended drawings, wherein.

DETAILED DESCRIPTION

In FIGS. 3-7, broad arrows will be used to indicate directions from which force or motion is generated that is imparted onto a given tooling part. For example, an arrow may indicate a direction in which this tooling part is moving or it may indicate a direction from which the tooling part experiences a force.

Figures 1, 2:
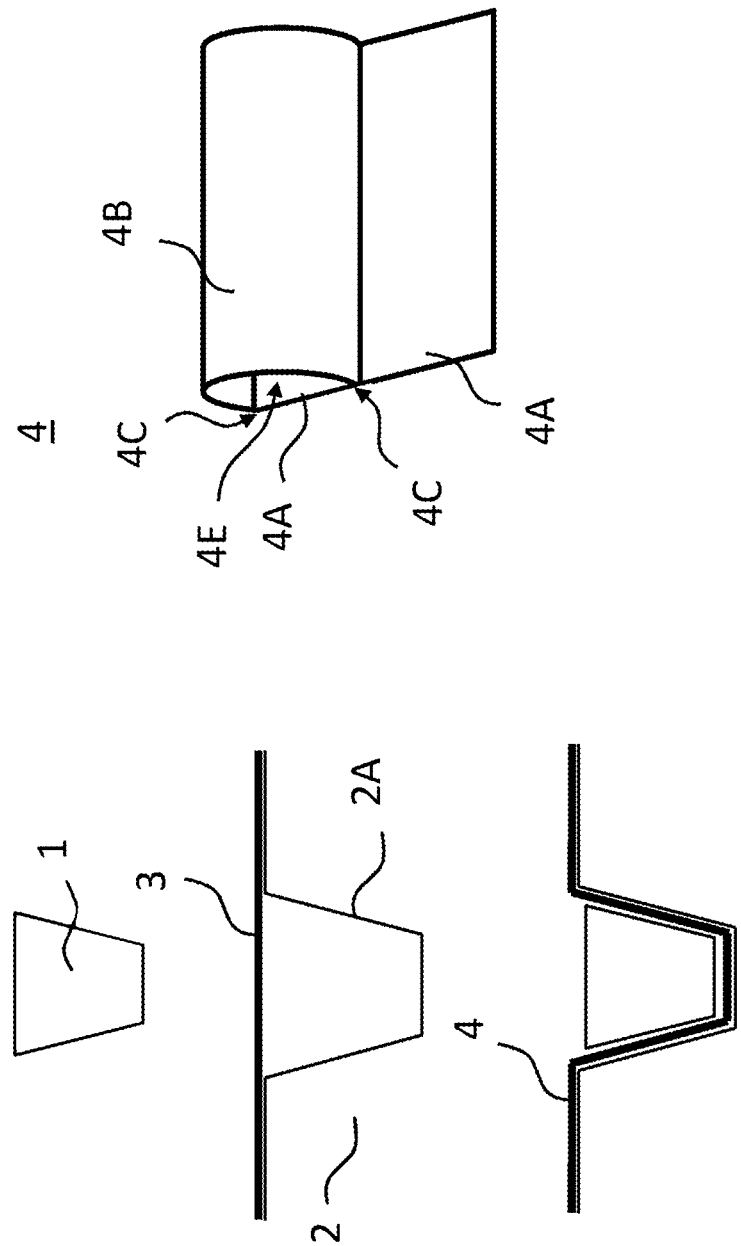
FIG. 1 illustrates a known method for forming a sheet of thermoplastic composite material.
FIG. 2 illustrates a known closed profile made from thermoplastic composite material.
Figure 3:
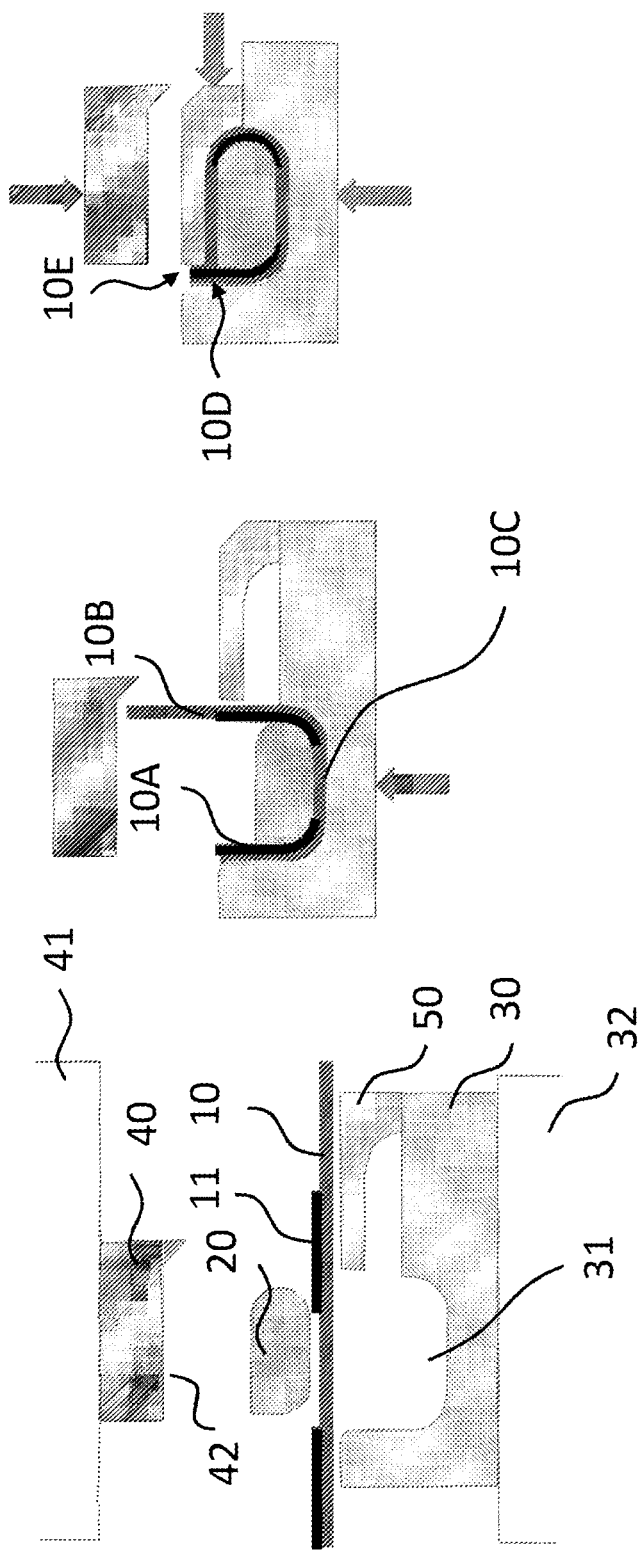
FIG. 3 illustrates a first example of a method for forming a sheet of thermoplastic composite material in accordance with the present invention.
Figure 4:
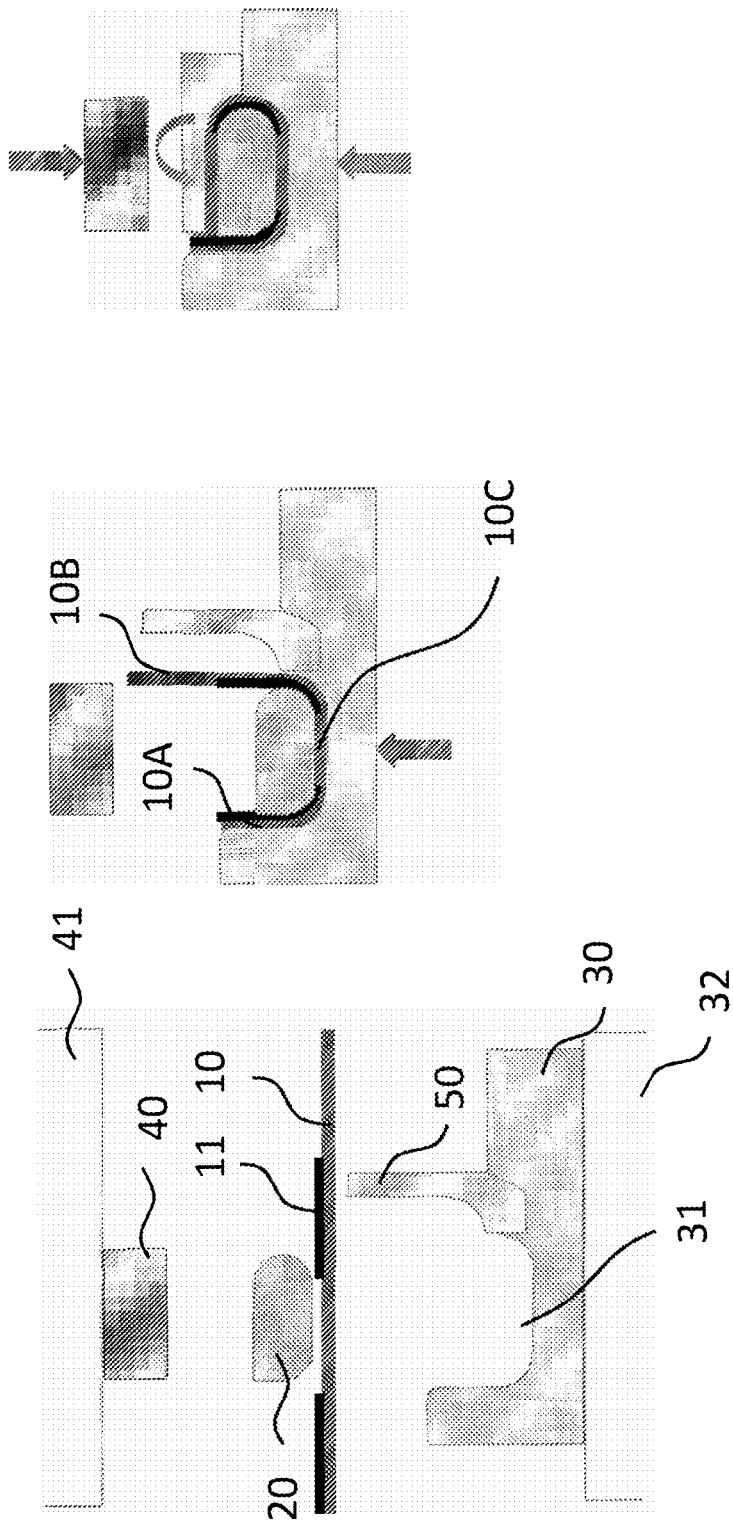
FIG. 4 illustrates a second example of a method for forming a sheet of thermoplastic composite material in accordance with the present invention.
Figure 5:
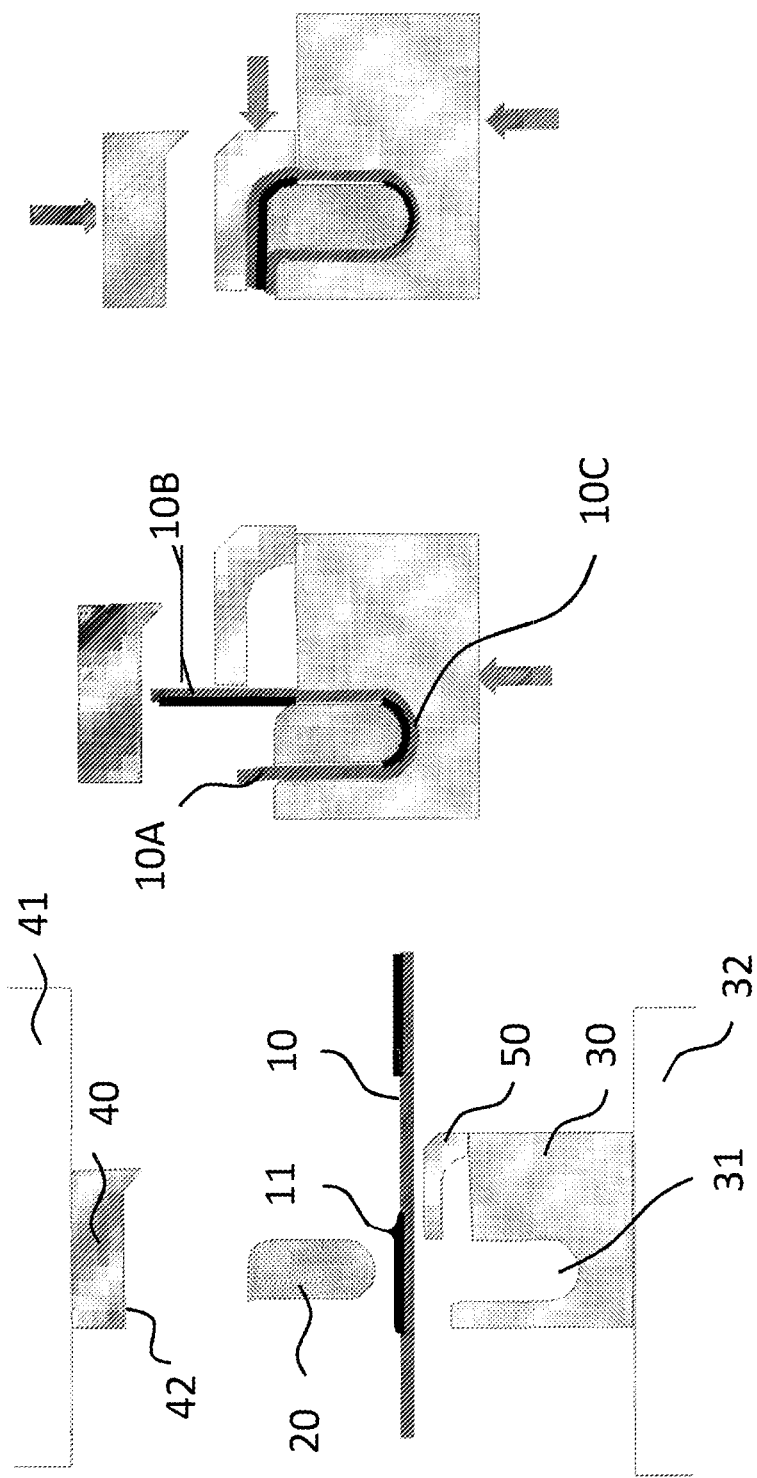
FIG. 5 illustrates a third example of a method for forming a sheet of thermoplastic composite material in accordance with the present invention.

FIGS. 3, 4, and 5 illustrate a first, second, and third example of a method for forming a sheet of thermoplastic composite material using a tooling in accordance with the present invention, respectively.

The tooling comprises a male tooling part 20, a female tooling part 30, a pressing tooling part 40, at least one auxiliary tooling part 50, and a drive system (not shown) for actuating the various tooling parts. Female tooling part 30 is mounted on a first support 32. Similarly, pressing tooling part 40 is mounted on a second support 41. Supports 32, 41 can be embodied as plates that can be driven by pneumatic or hydraulic cylinders, or supports 32, 41 can be part of or connected to a stationary frame. At least one of first support 32 and second support 41 can be actuated by the drive system. Furthermore, auxiliary tooling part(s) 50 can be also be actuated or driven by drive system using pneumatic or hydraulic cylinders.

The forming process in accordance with the present invention comprises three forming stages which will be discussed next.

As the first forming stage, a sheet 10 of thermoplastic composite material is arranged in between male tooling part 20 and female tooling part 30. Female tooling part 30 comprises a recess 31 in which male tooling part 20 can be partially received.

In addition to sheet 10, reinforcing material 11 can be arranged on top of or integrated into sheet 10. For example, the number of plies used for forming sheet 10 can be higher at the positions indicated by reference sign 11 than in a remaining part of sheet 10. Alternatively, a second sheet could be arranged on top of sheet 10 at the indicated positions. The reinforcing material can also be in the form of flowable material, e.g. a glass mat reinforced thermoplastic, a long-fiber reinforced thermoplastic, stitch needled mats, or the like.

As will be explained in more detail referring to FIGS. 8A and 8B, male tooling part 20 is mechanically coupled to pressing tooling part 40 using resilient members. This coupling is not shown in FIG. 3.

During the first forming stage, first support 32 and/or second support 41 will be actuated to bring supports 32, 41 closer together. This will push sheet 10 into engagement with male tooling part 20, which will in turn form sheet 10. This first forming stage ends when male tooling part 20 is received in recess 31. At this moment, shown in the middle in FIGS. 3, 4, 5, sheet 10 comprises an intermediate segment 10C that is arranged in a first space between male tooling part 20 and female tooling part 30. Intermediate segment 10C is integrally connected to a first segment 10A and a second segment 10B that each extend away from the first space.

During the second forming stage, second segment 10B is pushed towards first segment 10A using an auxiliary tooling part 50 that is driven by the drive system. Auxiliary tooling part 50 can be slideably mounted to female tooling part 30 as shown in FIGS. 3 and 4 or pivotally mounted as shown in FIG. 4. As shown in FIGS. 3, 4, and 5, auxiliary tooling part 50 pushes and/or forms second segment 10B to abut first segment 10A. More in particular, in the final position of auxiliary tooling part 50 at the end of the second forming stage, intermediate segment 10C and parts of first segment 10A and second segment 10B are confined in a space that in FIGS. 3, 4, and 5 is defined by male tooling part 20, female tooling part 30, and auxiliary part 50.

During the third forming stage, first support 32 and/or second support 41 are actuated to bring them even closer together as illustrated in the figures on the right. During this step, male tooling part 20 will move towards pressing tooling part 40 against a spring biasing force exerted by the resilient member(s) that connect male tooling part 20 and pressing tooling part 40. At the end of this mutual movement, pressing tooling part 40 will lie against auxiliary tooling part 50. To this end, pressing tooling part 40 is provided with a recess 42 in which male tooling part 20 can be partially accommodated. More in particular, pressing tooling part 40 will exert a pressure onto thermoplastic composite material via auxiliary tooling part 50. During the application of this pressure, a seam 10D will be formed connecting first segment 10A and second segment 10B. As shown, intermediate segment 10C and seam 10D are arranged in a second space that in FIGS. 3, 4, and 5 is defined by male tooling part 20, female tooling part 30, and auxiliary part 50. This second space is provided with an opening 10E. Through opening 10E, the first and/or second segments 10A, 10B may extend depending on the final shape of the desired elongated closed profile.

Figure 6:
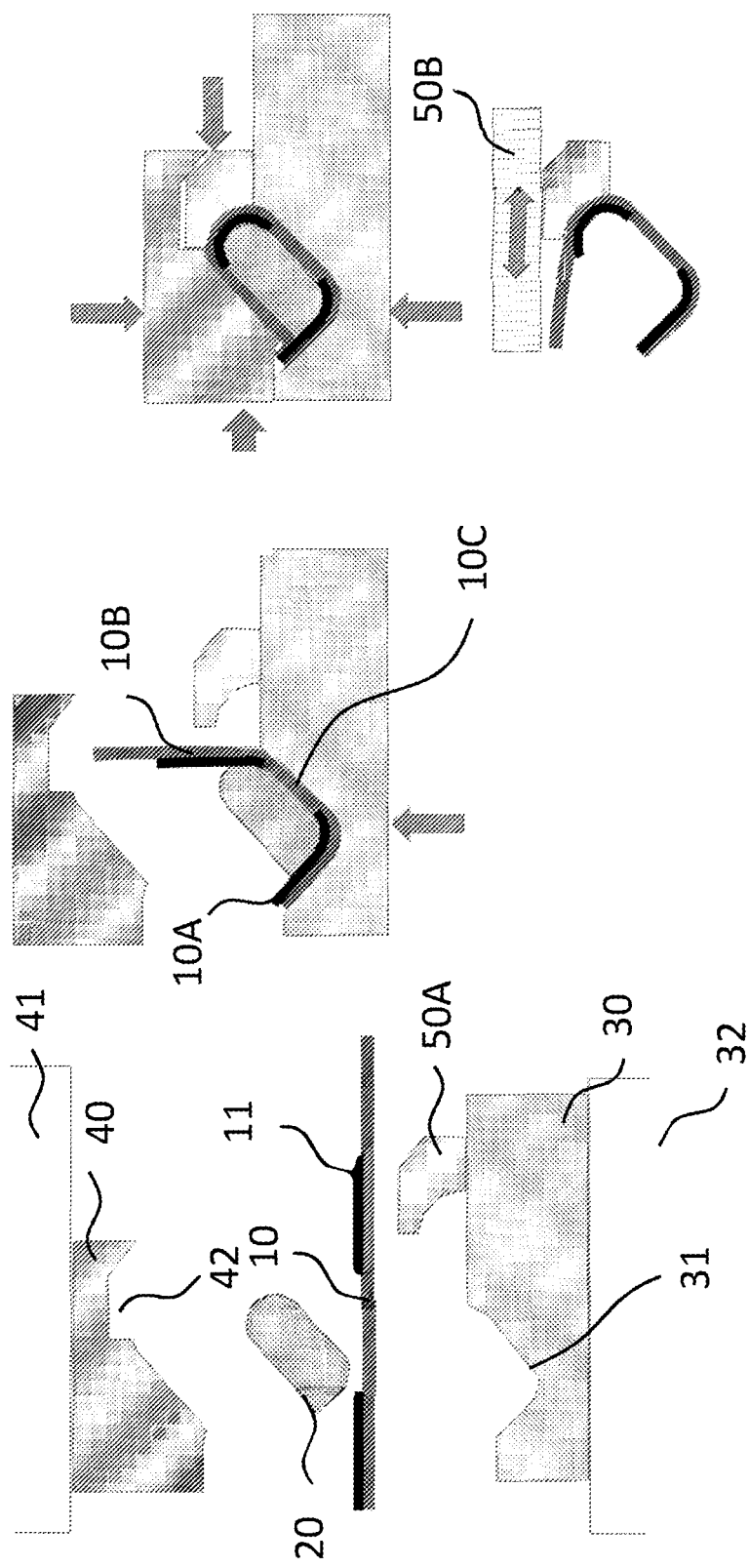
FIG. 6 illustrates a fourth example of a method for forming a sheet of thermoplastic composite material in accordance with the present invention.
Figure 7:
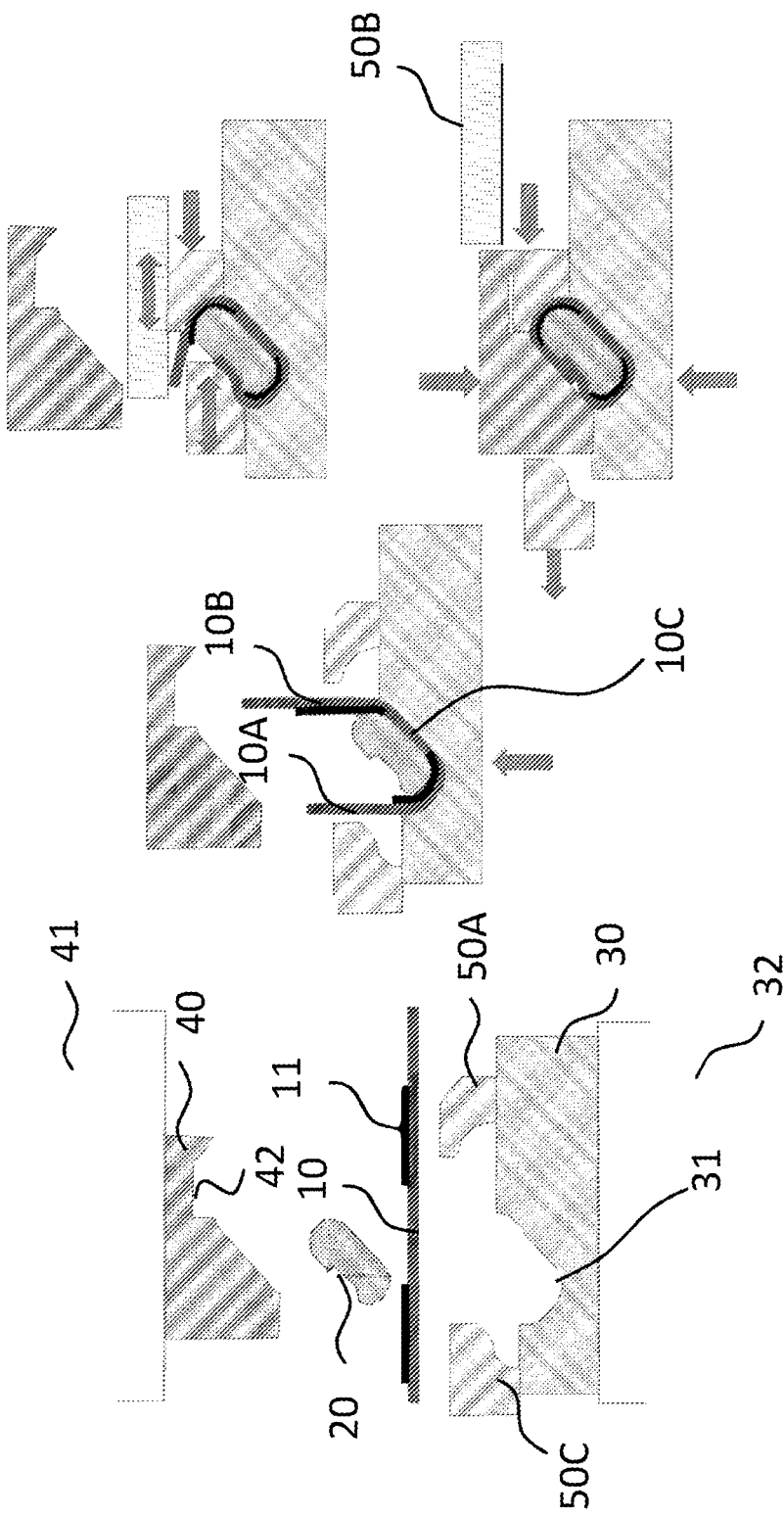
FIG. 7 illustrates a fifth example of a method for forming a sheet of thermoplastic composite material in accordance with the present invention.

FIGS. 6 and 7 illustrate a fourth and fifth example of a method for forming a sheet of thermoplastic composite material in accordance with the present invention, respectively. In FIG. 6, two auxiliary parts 50A, 50B are used. Auxiliary part 50A is actuated first by the drive system, followed by auxiliary part 50B as shown in the bottom right figure. It is noted that only auxiliary part 50A remains in place during the third forming stage in which pressing tooling part 40 partially presses onto sheet 10 directly and partially via auxiliary part 50A. Auxiliary part 50B is moved away to allow auxiliary part 50A to be received in recess 42 of pressing tooling part 40 as shown in the figure on the right.

In FIG. 7, three auxiliary parts 50A, 50B, 50C are used. In this embodiment, auxiliary part 50A engages second segment 10B and auxiliary part 50C engages first segment 10A. This may occur simultaneously. Thereafter, auxiliary part 50B engages second segment 10B. Having completed its motion, auxiliary part 50B and auxiliary part 50C are moved away to allow auxiliary part 50A to be received in recess 42 of pressing tooling part 40 as shown in the bottom right figure.

During the third forming stage, pressure is exerted by pressing tooling part 40 onto sheet 10, either directly or indirectly. This pressure may be generated by driving first support 32 and/or second support 41. Additionally, the auxiliary part that is partially received in recess 42 may also be driven.

Figure 8A:
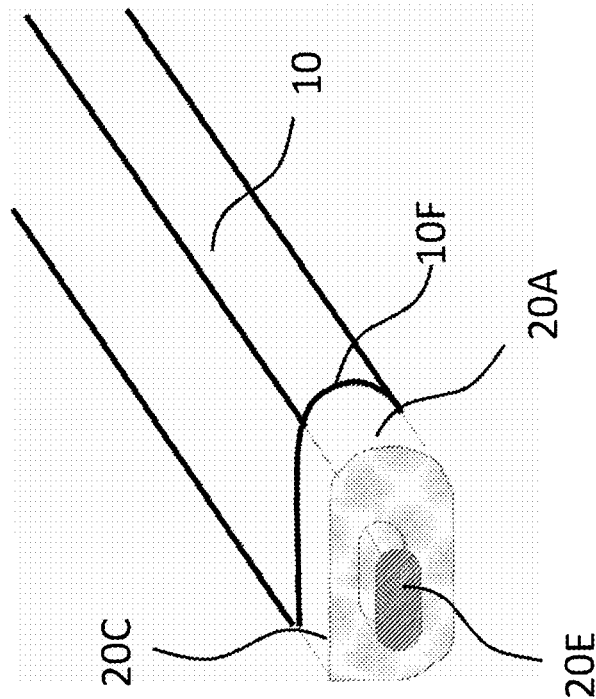
FIGS. 8A and 8B illustrate detailed views of a male tooling part in accordance with the present invention.
Figure 8B:
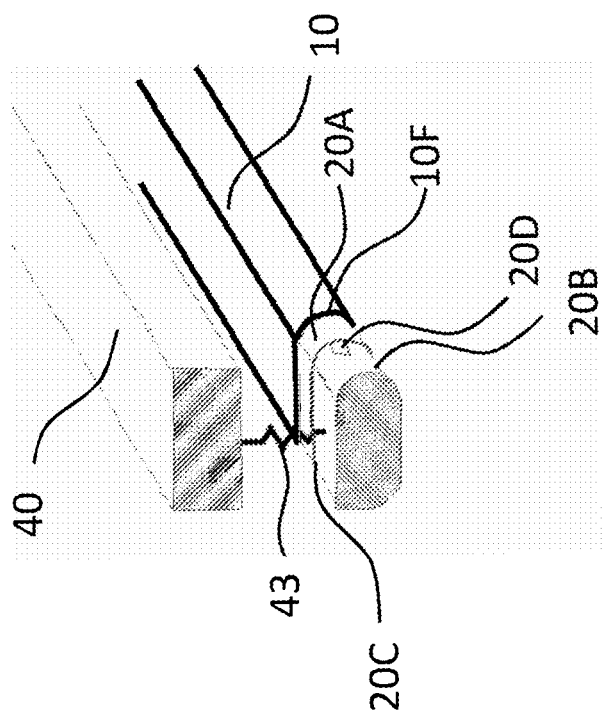

FIGS. 8A and 8B illustrate detailed views of a male tooling part in accordance with the present invention. Male tooling part 20 comprises a first section 20A and two second sections 20B that are arranged on opposite sides of first section 20A of which only one is shown. The present invention does however not exclude that more or less second sections are used.

Second section 20B is mechanically coupled to pressing tooling part 40 using a resilient member 43. Unlike first section 20A, second section 20B does not engage material 10. In FIGS. 8A and 8B this is illustrated by an edge 10F of material 10 being positioned on the first section side of boundary 20C between first section 20A and second section 20B.

FIGS. 8A and 8B illustrates how thermoplastic composite material 10 has been folded, shaped, or otherwise formed around male tooling part 20 during the third forming stage. In FIGS. 8A and 8B, the other components of the tooling are omitted for illustrative purposes.

Second section 20B is releasably coupled to first section 20A. To this end, both sections may comprise coupling means for enabling such coupling. For example, FIG. 8A illustrates a slot 20D arranged inside second section 20B. As shown in FIG. 8B, first section 20A comprises a protrusion 20E that can be inserted laterally into slot 20D for coupling first section 20A to second section 20B.

In FIG. 8B, second section 20B is decoupled from first section 20A. After decoupling, first section 20A with sheet 10 around it can be removed from female tooling part 30 and first section 20A can be removed out off the closed inner space of the profile formed using material 10.

Figure 9C:
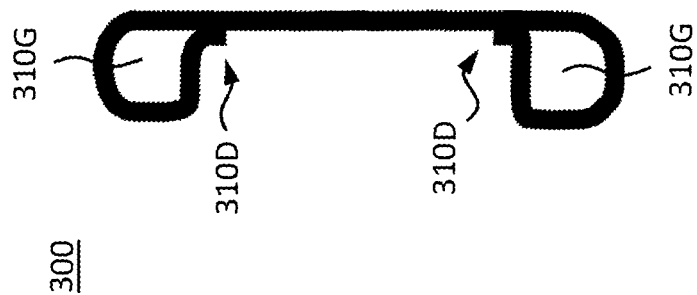
FIGS. 9A, 9B, and 9C illustrate exemplary elongated closed profiles of thermoplastic composite material in accordance with the present invention.
Figure 9B:
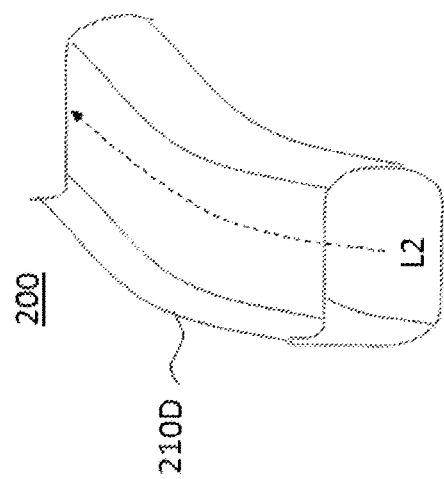
Figure 9A:
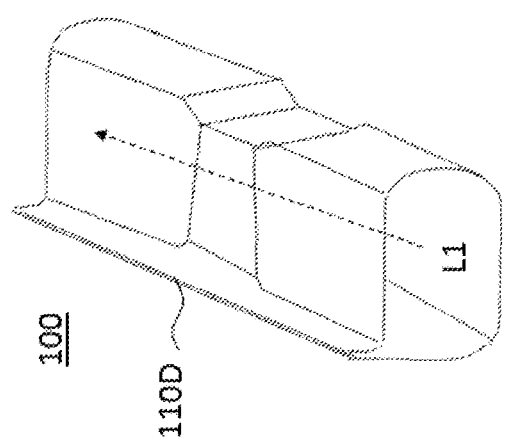

FIGS. 9A and 9B illustrate exemplary elongated closed profiles of thermoplastic composite material in accordance with the present invention. As shown in FIG. 9A, the present invention does not exclude an elongated closed profile 100 having a varying cross sectional shape along its longitudinal axis L1. Furthermore, as shown in FIG. 9B, an elongated closed profile 200 may have a tapering along its longitudinal axis L2 and the longitudinal axis itself may be straight, as in FIG. 9A, or curved, as in FIG. 9B. For both embodiments, the first and second segments are connected using a single seam only 110D, 210D.

The present invention does not exclude profiles having multiple closed inner spaces, each inner space being formed as described above. An example of such profile is illustrated in FIG. 9C. As shown, profile 300 comprises two seams 310D by which two closed inner spaces 310F are formed. Profile 300 could for example be manufactured using a tooling as depicted in FIG. 5. In this tooling, a single female tooling part 30 could be used that is provided with two recesses 31. In addition, two spaced apart male tooling parts 20 could be used to define inner spaces 310F, which parts are both coupled to a common pressing tooling part 40. For each closed inner space 310F, a respective auxiliary part 50 could be used. Alternatively, a tooling could be used in which a single female tooling part is used that is provided with one large recess. In addition, two spaced apart male tooling parts could be used to define the inner spaces, which parts are both coupled to a common pressing tooling part. For each closed inner space, a respective auxiliary part could be used. During the third forming stage, the pressing tooling part would press on the thermoplastic composite material in region between the male tooling parts, and on the auxiliary parts.

In the above, the present invention has been explained using detailed embodiments thereof. However, the present invention is not limited to these embodiments. Various modifications are possible without deviating from the scope of the present invention which is defined by the appended claims.

The invention claimed is:

1. A method for forming a heated thermoplastic composite material into a closed profile using a tooling, the method comprising:
   a) forming, during a first forming stage, a heated thermoplastic composite material in a first space between a male tooling part and a female tooling part, the thermoplastic composite material comprising, after having performed the first forming stage, a first segment, a second segment, and an intermediate segment integrally connecting the first segment to the second segment, wherein the intermediate segment is arranged in the first space, and wherein the first segment and the second segment extend outside of said first space;
   b) forming, during at least one second forming stage, the thermoplastic composite material by engaging the first segment and/or second segment with at least one auxiliary tooling part to thereby bring the first and second segments closer together; and
   c) forming, during a third forming stage, the thermoplastic composite material by pressing, using a pressing tooling part, the thermoplastic composite material around the male tooling part thereby creating a seam between the first and second segment, wherein during the third forming stage the intermediate segment and parts of the first segment and second segment associated with the seam are confined in a second space between the male tooling part, the female tooling part, and at least one among the pressing tooling part and the at least one auxiliary tooling part;
   wherein during the third forming stage, the second space is completely delimited by the male tooling part, the female tooling part, and one or more auxiliary tooling parts among the at least one auxiliary tooling part, and wherein during the third forming stage, the pressing tooling part (40) presses solely onto said one or more auxiliary tooling parts.

2. The method according to claim 1, wherein the second forming stage is performed by engaging the first segment from a first direction and/or by engaging the second segment from a second direction;
- wherein the third forming stage is performed by pressing the thermoplastic composite material from a third direction;
- wherein both the first and second direction are each at least partially perpendicular to the third direction; and
- wherein the first and second direction are at least partially opposite to each other.

3. The method according to claim 2, wherein during the first forming stage, the male tooling part exerts pressure on the thermoplastic composite material that is at least partially directed in the third direction.

4. The method according to claim 1, wherein the female tooling part comprises a recess, wherein the first forming stage comprises mutually moving the male tooling part and the female tooling part towards each other such that the male tooling part becomes at least partially accommodated in a recess in the female tooling part while the thermoplastic composite material is arranged in said first space between the male tooling part and the female tooling part; and/or
- wherein during the third forming stage, the first and second segments are fully confined in said second space, or wherein said second space has an opening through which at least one of the first segment and second segment extends.

5. The method according to claim 1, wherein the male tooling part comprises a first section configured for pressing against the thermoplastic composite material and at least one second section that is releasably coupled to the first section and that is configured to be supported or driven during the second and third forming stages, wherein the method further comprises separating the formed thermoplastic composite material from the male tooling part by decoupling the at least one second section from the first section, separating the decoupled at least one second section from the first section, and separating the first section from the formed thermoplastic composite material.

6. The method according to claim 5, further comprising performing, prior to the step of separating the formed thermoplastic composite material from the male tooling part:
- separating the pressing tooling part from the male tooling part;
- in so far as the second space is delimited by the male tooling part, the female tooling part, one or more auxiliary tooling parts among the at least one auxiliary tooling part during the third forming stage, separating said one or more auxiliary parts from the male tooling part;
- jointly separating the male tooling part and the formed thermoplastic composite material from the female tooling part.

7. The method according to claim 1, wherein the second forming stage comprises engaging the first segment and/or second segment with at least one auxiliary tooling part to thereby bring the first and second segments into abutment; or
- wherein the second forming stage comprises engaging each of the first segment and/or second segment sequentially with different auxiliary tooling parts among the at least one auxiliary tooling part.

8. The method according to claim 1, wherein the male tooling part, the female tooling part, the at least one auxiliary tooling part, and the pressing tooling part are elongated along respective longitudinal axes, wherein during the third forming stage and at least locally:
- the male tooling part, female tooling part, the at least one auxiliary tooling part, and in so far as the second space is delimited by the male tooling part, the female tooling part, one or more auxiliary tooling parts among the at least one auxiliary tooling part during the third forming stage, the pressing tooling part, engage the thermoplastic composite material from respective directions that are each at least locally perpendicular to the respective longitudinal axis; and
- wherein the second space is curved or straight along its longitudinal axis; and/or
- wherein the second space is tapered along its longitudinal axis.

9. The method according to claim 1, wherein the heated thermoplastic composite material to be formed is provided as a sheet, the sheet comprising a consolidated stack of plies, each plie comprising fibers that are oriented in a given direction and that are encapsulated, surrounded, and/or supported by a layer of thermoplastic material, wherein the orientation of the fibers changes in the stack.

10. The method according to claim 9, wherein the sheet comprises reinforcing material arranged on top of or integrated into the sheet;
- wherein the reinforcing material is formed by the number of plies used for forming the sheet being higher at some positions than in a remaining part of the sheet; or
- wherein, at some positions, a second sheet of thermoplastic composite material is arranged on top of the sheet; or
- wherein the reinforcing material is in the form of flowable material, such as a glass mat reinforced thermoplastic, a long-fiber reinforced thermoplastic, or stitch needled mats.

11. A method for forming a heated thermoplastic composite material into a closed profile using a tooling, the method comprising:
- a) forming, during a first forming stage, a heated thermoplastic composite material in a first space between a male tooling part and a female tooling part, the thermoplastic composite material comprising, after having performed the first forming stage, a first segment, a second segment, and an intermediate segment integrally connecting the first segment to the second segment, wherein the intermediate segment is arranged in the first space, and wherein the first segment and the second segment extend outside of said first space;
- b) forming, during at least one second forming stage, the thermoplastic composite material by engaging the first segment and/or second segment with at least one auxiliary tooling part to thereby bring the first and second segments closer together; and
- c) forming, during a third forming stage, the thermoplastic composite material by pressing, using a pressing tooling part, the thermoplastic composite material around the male tooling part thereby creating a seam between the first and second segment, wherein during the third forming stage the intermediate segment and parts of the first segment and second segment associated with the seam are confined in a second space between the male tooling part, the female tooling part, and at least one among the pressing tooling part and the at least one auxiliary tooling part;

wherein during the third forming stage, the second space is delimited by the male tooling part, the female tooling part, one or more auxiliary tooling parts among the at least one auxiliary tooling part, and the pressing tooling part, wherein the pressing tooling part is provided with one or more recesses, and wherein during the third forming stage, a part of the pressing tooling part presses onto the thermoplastic composite material directly and a part of the pressing tooling part presses onto the thermoplastic composite material through said one or more auxiliary tooling parts that are at least partially received in the one or more recesses of the pressing tooling part.

12. The method according to claim 11, wherein the second forming stage is performed by engaging the first segment from a first direction and/or by engaging the second segment from a second direction;
   wherein the third forming stage is performed by pressing the thermoplastic composite material from a third direction;
   wherein both the first and second direction are each at least partially perpendicular to the third direction; and
   wherein the first and second direction are at least partially opposite to each other.

13. The method according to claim 12, wherein during the first forming stage, the male tooling part exerts pressure on the thermoplastic composite material that is at least partially directed in the third direction.

14. The method according to claim 11, wherein the female tooling part comprises a recess, wherein the first forming stage comprises mutually moving the male tooling part and the female tooling part towards each other such that the male tooling part becomes at least partially accommodated in a recess in the female tooling part while the thermoplastic composite material is arranged in said first space between the male tooling part and the female tooling part; and/or
   wherein during the third forming stage, the first and second segments are fully confined in said second space, or wherein said second space has an opening through which at least one of the first segment and second segment extends.

15. The method according to claim 11, wherein the male tooling part comprises a first section configured for pressing against the thermoplastic composite material and at least one second section that is releasably coupled to the first section and that is configured to be supported or driven during the second and third forming stages, wherein the method further comprises separating the formed thermoplastic composite material from the male tooling part by decoupling the at least one second section from the first section, separating the decoupled at least one second section from the first section, and separating the first section from the formed thermoplastic composite material.

16. The method according to claim 15, further comprising performing, prior to the step of separating the formed thermoplastic composite material from the male tooling part:
   separating the pressing tooling part from the male tooling part;
   in so far as the second space is delimited by the male tooling part, the female tooling part, one or more auxiliary tooling parts among the at least one auxiliary tooling part during the third forming stage, separating said one or more auxiliary parts from the male tooling part;
   jointly separating the male tooling part and the formed thermoplastic composite material from the female tooling part.

17. The method according to claim 11, wherein the second forming stage comprises engaging the first segment and/or second segment with at least one auxiliary tooling part to thereby bring the first and second segments into abutment; or
   wherein the second forming stage comprises engaging each of the first segment and/or second segment sequentially with different auxiliary tooling parts among the at least one auxiliary tooling part.

18. The method according to claim 11, wherein the male tooling part, the female tooling part, the at least one auxiliary tooling part, and the pressing tooling part are elongated along respective longitudinal axes, wherein during the third forming stage and at least locally:
   the male tooling part, female tooling part, the at least one auxiliary tooling part, and in so far as the second space is delimited by the male tooling part, the female tooling part, one or more auxiliary tooling parts among the at least one auxiliary tooling part during the third forming stage, the pressing tooling part, engage the thermoplastic composite material from respective directions that are each at least locally perpendicular to the respective longitudinal axis; and
   wherein the second space is curved or straight along its longitudinal axis; and/or
   wherein the second space is tapered along its longitudinal axis.

19. The method according to claim 11, wherein the heated thermoplastic composite material to be formed is provided as a sheet, the sheet comprising a consolidated stack of plies, each plie comprising fibers that are oriented in a given direction and that are encapsulated, surrounded, and/or supported by a layer of thermoplastic material, wherein the orientation of the fibers changes in the stack.

20. The method according to claim 19, wherein the sheet comprises reinforcing material arranged on top of or integrated into the sheet;
   wherein the reinforcing material is formed by the number of plies used for forming the sheet being higher at some positions than in a remaining part of the sheet; or
   wherein, at some positions, a second sheet of thermoplastic composite material is arranged on top of the sheet; or
   wherein the reinforcing material is in the form of flowable material, such as a glass mat reinforced thermoplastic, a long-fiber reinforced thermoplastic, or stitch needled mats.

\* \* \* \* \*